Dec. 4, 1934.  L. A. LAURSEN  1,982,674
SEALING RING FOR TIRE CASINGS
Filed April 4, 1932  3 Sheets-Sheet 1

INVENTOR.
L. A. Laursen
BY
ATTORNEYS

Dec. 4, 1934. L. A. LAURSEN 1,982,674
SEALING RING FOR TIRE CASINGS
Filed April 4, 1932 3 Sheets-Sheet 2

INVENTOR.
L. A. Laursen
BY
ATTORNEYS

Dec. 4, 1934.   L. A. LAURSEN   1,982,674
SEALING RING FOR TIRE CASINGS
Filed April 4, 1932    3 Sheets-Sheet 3

INVENTOR.
L. A. Laursen
BY
ATTORNEYS

Patented Dec. 4, 1934

1,982,674

UNITED STATES PATENT OFFICE 1,982,674

SEALING RING FOR TIRE CASINGS

Laurits A. Laursen, Akron, Ohio

Application April 4, 1932, Serial No. 602,957

9 Claims. (Cl. 18—45)

This invention relates to sealing rings such as are used for vulcanizing tire casings in molds under the action of direct internal fluid pressure.

As heretofore proposed, these sealing rings are in the form of a solid or relatively rigid annulus (sometimes of metal, sometimes of solid rubber, and sometimes of rubberized fabric) provided with a valve stem for the admission of the pressure fluid, which may be air, steam, water, or some other fluid. In vulcanizing a tire casing, the sealing ring is first inserted within the casing, and the casing with the contained ring then placed in a sectional mold; thereafter, with the mold closed and the casing sealed at the beads, the pressure fluid (usually heated) is admitted into the sealed casing to expand the same against the walls of the mold, and the mold is heated (by a steam jacket if of the individual vulcanizer variety, or by placing it within a pot heater if not steam jacketed) for the requisite time to effect vulcanization. In some instances, the tire casing is mounted on bead rings before being placed in the mold, while in other instances the bead rings are formed integral with the mold so as to effect the "rimming up" of the casing in the act of closing the mold. In either case, the bead rings form part of the mold during vulcanization, and it is quite important that the beads or bead portions (which, as will be understood, are more or less shapeless in the green or unvulcanized condition of the tire casing) be pressed firmly into their seats in the mold in order that they may be molded to proper shape during vulcanization.

Heretofore, the shaping of the bead portions has had to be performed mainly in the green or unvulcanized condition of the tire casing, since, on account of the sealing ring being solid or relatively rigid and occupying the whole of the bead zones, the pressure fluid when admitted into the sealed casing is incapable of exerting much, if any, influence on the shaping of the beads. In other words, when the tire casing is "rimmed up", the bead rings or the mold sections formed with the bead seats are drawn together to press the beads firmly against the solid sealing ring, and it is this pressure which is largely relied upon to force the bead portions into the mold seats to shape them, the subsequent vulcanization merely acting to give permanent form to the bead portions as thus shaped in the green or raw state. The success of this old practice has depended to a great extent upon the accuracy in making up the bead portions in the raw casing, care being taken that the proper volume of stock is allowed in building the casing, and that the stock is properly finished so as to avoid buckles or wrinkles or other irregularities.

Notwithstanding the extreme care which may thus be observed, it frequently happens that the finished beads are faulty, sometimes being too large or bulky, at other times too small or made with insufficient stock, and quite often wrinkled or buckled or otherwise irregularly formed or contoured. These faults are bound to be reflected in the vulcanized tire casing because the pressure fluid is totally incapable of remedying them. Thus, if the bead portions are too large, the stock, after filling up the bead seats, is caused to flow up along the inside of the tire casing beyond the sealing ring, being squeezed or forced in that direction by the pressure applied by the solid sealing ring in the rimming-up operation. On the other hand, if the bead portions are too small, the pressure of the sealing ring is insufficient to hold them in place during the expansion of the tire casing under the internal fluid pressure, and as a result the inner plies of the carcass are pulled up and away from the beads proper, producing a rounded toe effect in contrast to the sharp pointed toe which it is the aim to produce. In the case of wrinkles or buckles, the pressure of the sealing ring is of course non-uniform throughout the circumference of the beads, as it should be, and hence the cords of the carcass are stretched more in some places than in others, thus producing a non-uniform tension in the different cords of the tire casing in addition to causing misshaped beads. Perhaps of greater importance, if the sealing ring for any reason fails to fit smoothly and with uniform pressure against the bead portions, the pressure fluid will leak past the sealing ring and not only prevent the proper shaping of the bead portions but in addition (especially in the case of water) find its way into the fabric structure of the tire casing and damage it in one way or another,—in most instances producing an imperfect tire.

These and other defects (discovered after long study and experimentation) are obviated by the present invention, which is directed to an improved form of sealing ring capable not only of effecting a preliminary shaping of the bead portions during the rimming up process, but later during vulcanization of giving permanent shape to the bead portions under the influence and without leakage of the internal fluid pressure which expands the tire casing as a whole. To this end, the improved sealing ring (made preferably of rubber as usual) is formed so as to be sufficiently rigid to act as an abutment against which the bead portions may be locked preparatory to vulcanization and so as to be capable of free lateral expansion in the bead zones by the fluid pressure admitted into the sealed casing for vulcanization. Several different embodiments are shown herein and all will be described in detail later on. In one form, the sealing ring is composed of a relatively rigid base member and two flexible side members united thereto along lines located radially inward of the outer circumference of the base member, so as to leave at opposite sides of the base member in the bead zones narrow channels or passages adapted to communicate with the interior of the sealed casing.

According to this new construction of sealing ring, the high pressure maintained within the sealed tire casing during vulcanization will be caused to force the side walls of the sealing ring outwardly and press the bead portions into their mold seats. Being flexible, the side walls of the sealing ring will conform themselves to any irregularities in the bead portions, yielding sufficiently to absorb any surplus stock if the bead portions are too large, or expanding sufficiently to compensate for any deficiency in stock if the bead portions are too small, and thus exerting a uniform pressure against the bead portions throughout their entire circumference. Moreover, because of the laterally expansible character of the sealing ring, its side walls make a smooth fluid-tight fit against the bead portions of the casing and thus prevent leakage of the pressure fluid past the ring. In the specific form above alluded to, the side members act as lip gaskets which in response to the internal pressure are forced into firm contact with the bead portions and thereby effectively seal the casing against the escape of the pressure fluid. While thus made intentionally flexible and expansible, the side walls of the sealing ring at the beads will be amply supported against collapse during the rimming up process, this support being desirable to insure the preliminary seating of the bead portions in the mold seats, as well as their preliminary shaping.

Figure 1:
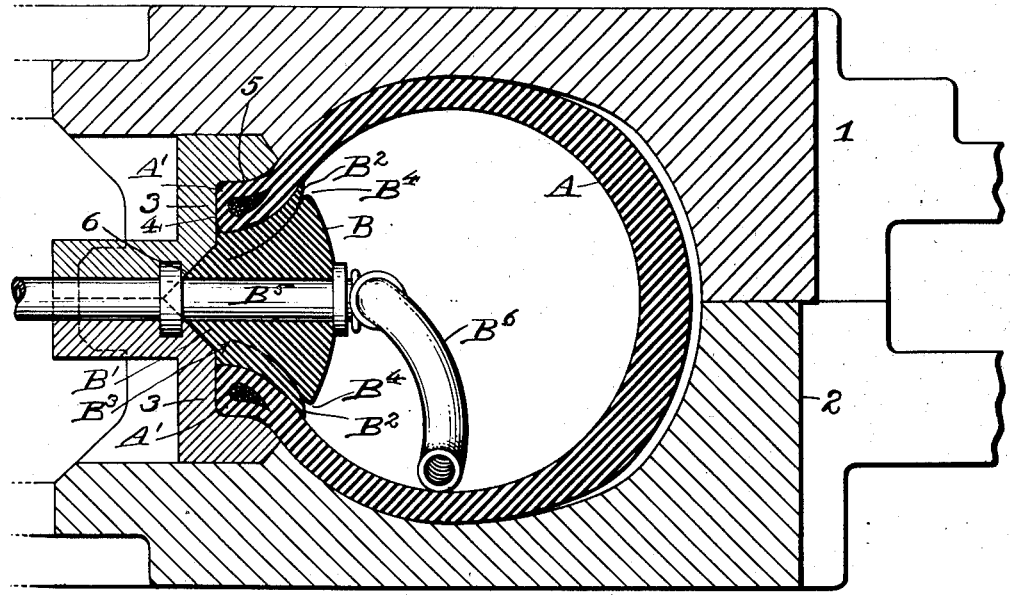
Fig. 1 is a cross section of a vulcanizing mold, showing a tire casing with the improved form of sealing ring therein before the casing is expanded in the mold by the admission of fluid pressure.
Figure 2:
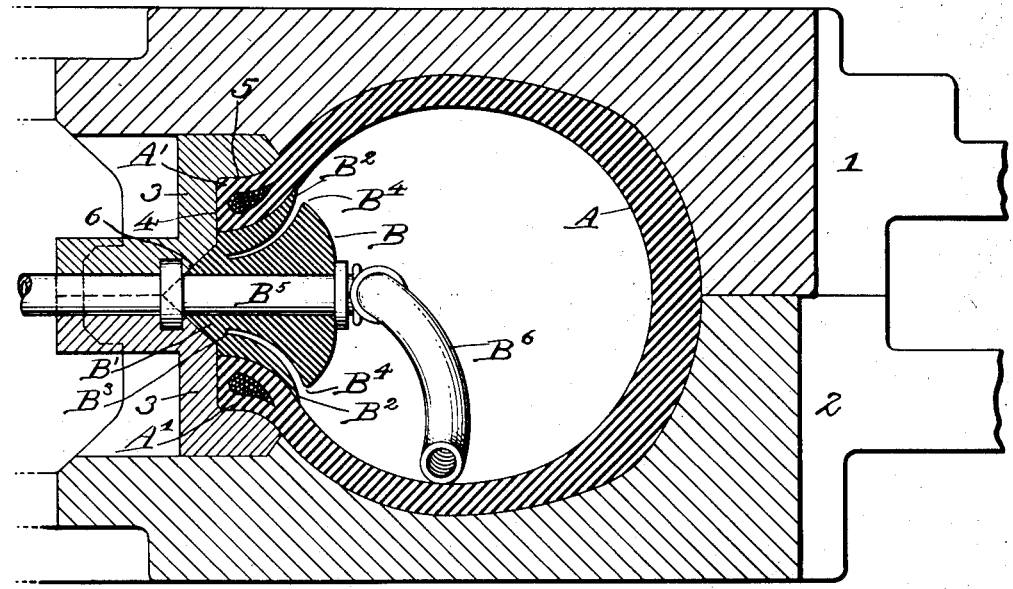
Fig. 2 is a similar view showing the tire casing as fully expanded in the mold by the fluid pressure or the condition of the parts during and after vulcanization.

Referring first to the embodiment illustrated in Figs. 1 and 2, the vulcanizing mold therein shown is of standard construction, comprising top and bottom sections 1 and 2 formed with a suitable cavity which determines the final size and shape of the vulcanized tire casing. For non-skid casings, the mold sections will be formed with pockets or depressions to give the particular tread design desired, but these depressions have been omitted from the drawings for the sake of clearance.

In both Figs. 1 and 2, it will be observed that the tire casing A is shown as mounted upon a pair of bead rings 3, which when placed in the mold form a part thereof and which are formed with seats for the beads or bead portions $A^1$ of the tire casing, these seats being constituted by the plain cylindrical outer faces 4 of the rings and the curved inner faces 5 of the side flanges with which the rings are provided. Bolts or other suitable locking devices are employed to hold the two bead rings in contacting relation as shown.

Figure 3:
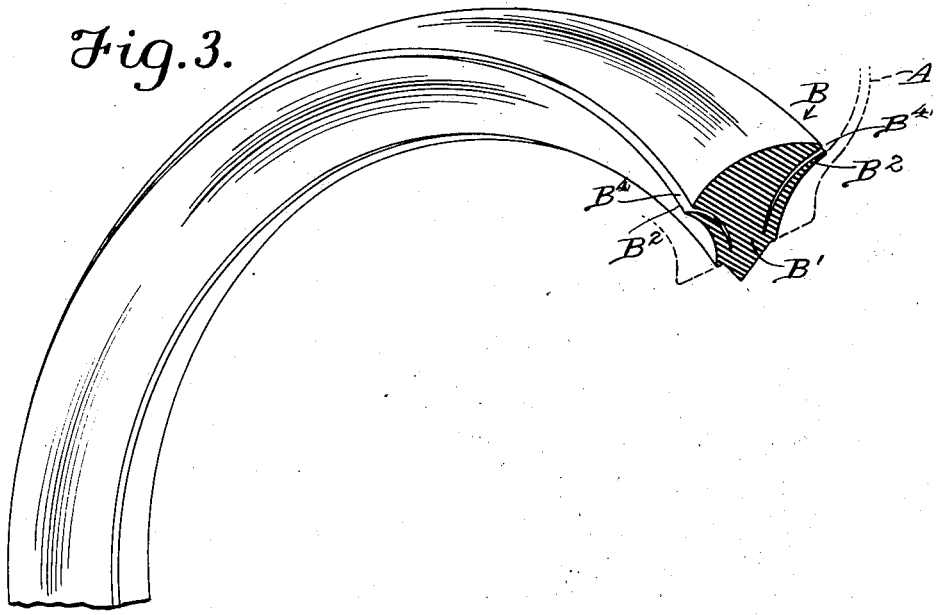
Fig. 3 is a perspective view of a section of the improved sealing ring detached.

Located within the tire casing is the improved form of sealing ring B (see also Fig. 3), which preferably is made of rubber and comprises a solid or relatively rigid base member $B^1$ and two flexible side members $B^2$, the base member being shaped at its inner periphery to fit within the V-shaped channel 6 formed by the bead rings. As will be observed, the side members $B^2$ are made to join the solid base member $B^1$ along lines $B^3$ located radially inward of the outer circumference of the base member, leaving at opposite sides thereof narrow annular channels or passages $B^4$ communicating with the interior of the sealed casing. It is pointed out that the depth of these channels or passages $B^4$ is such as approximately to reach the toes of the bead portions $A^1$ of the tire casing, thus allowing the flexible side members $B^2$ to extend radially inward far enough to occupy substantially the whole bead zones of the tire casing.

As thus constituted, the sealing ring will function in the manner previously described. Thus, when the tire casing with the sealing ring in place is mounted on the bead rings 3, the beads $A^1$ of the casing will be drawn inwardly against the solid base member $B^1$, which, being relatively rigid, will press the bead portions into the mold seats formed by the faces 4 and 5 of the bead rings. In this rimming-up operation, the side members $B^2$, being flexible, will yield until they are pressed up against the solid base member $B^1$, as shown by way of illustration in Fig. 1. Later, however, when pressure fluid is admitted into the sealed casing, the fluid will enter the channels or passages $B^4$ and force the side members $B^2$ outwardly again to whatever extent the bead portions $A^1$ of the tire casing will permit, as indicated in Fig. 2.

In other words, the pressure fluid admitted into the sealed casing is allowed to act directly against the bead portions to cause them to fill up the mold seats and to hold them therein during vulcanization. If the bead portions should be too large or bulky, the side members $B^2$ will, because of their flexibility, yield to the required extent during the locking up process and then during vulcanization apply a uniform pressure throughout the bead portions to shape them properly and without piling up the material above the sealing ring. If the bead portions should be too small, the side members $B^2$ will expand or spread laterally away from the base member $B^1$ under the action of the pressure fluid and act similarly to shape and mold the beads during vulcanization. In this same expanding action, the side members are forced into intimate contact with the bead portions, regardless of their size and shape, and hence will act as lip gaskets in sealing the fluid against escape, the side walls, because of their flexible and elastic character, readily conforming themselves to any wrinkles or irregularities in the bead portions. In short, the fluid pressure, being allowed to act directly in the bead zones, will exert the same pressure at the beads as at any other portion of the tire casing, with the result that all parts of the casing will be vulcanized under a uniform pressure.

The sealing ring is provided, as usual, with a valve stem $B^5$ through which the pressure fluid is admitted for vulcanization. As before stated, this pressure fluid may be water, steam, air, or some other fluid. If water is employed, it is recommended that the valve stem be equipped with a flexible hose section $B^6$ which may rest at its free end upon the bottom side of the tire cavity at its lowest point. Since this feature forms no part of the present invention, no further description will be given, although, if desired, reference may be had to my copending application Serial No. 166,056, filed February 5, 1927, for a full disclosure of a method and apparatus which can be employed in the carrying out of the vulcanization of tire casings under the action of water. In this same application, there is also disclosed a sealing ring equipped with two valve stems with similar hose sections, such as may be used in circulating water continuously through the sealed casing during vulcanization.

Figure 9:
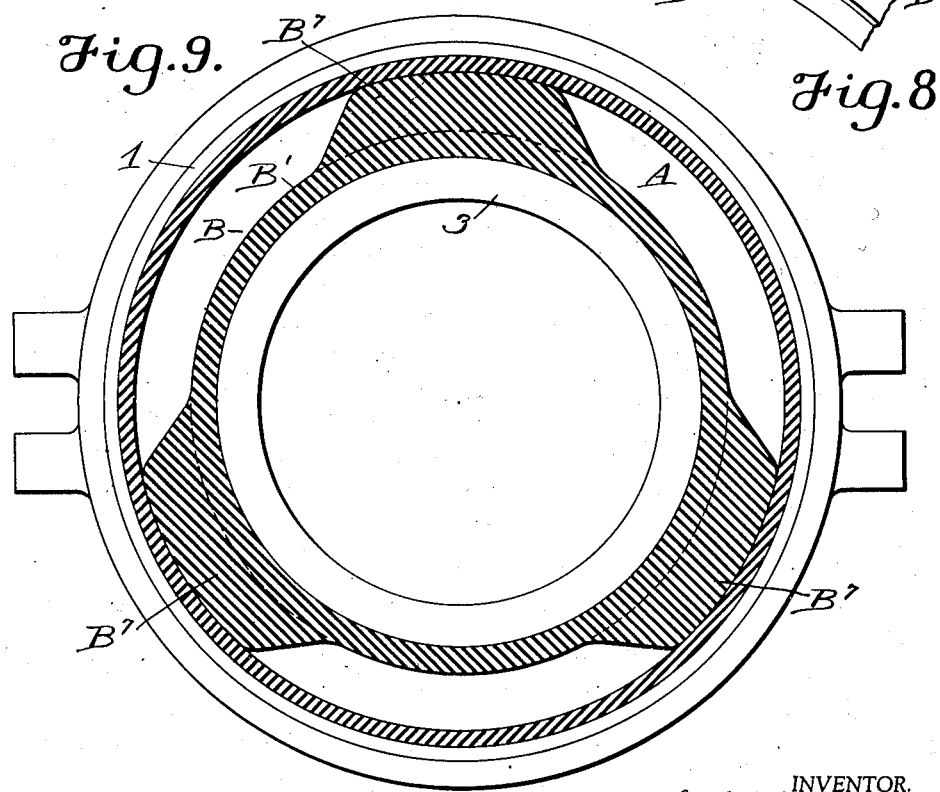
Fig. 9 is a plan view of the first form of sealing ring shown as equipped with tire supporting lobes.

In Fig. 9, the base member $B^1$ of the sealing ring B is shown as formed with three lobes or projections $B^7$ projecting radially therefrom at equidistantly spaced points in its circumference. As thus formed, the sealing ring is better adapted for use in connection with tire casings made in pulley band form as distinguished from those built on a core in tire shape, the lobes $B^7$ acting to hold the casing in tire shape until the pressure fluid is admitted into the casing.

Figure 4:
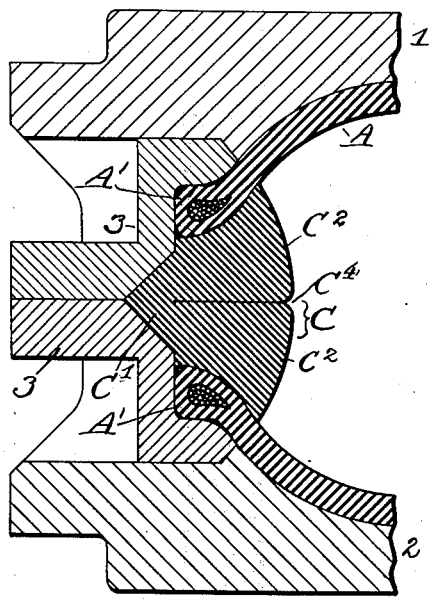
Figs. 4 and 5 are views similar to Figs. 1 and 2, showing a second form of sealing ring.
Figure 5:
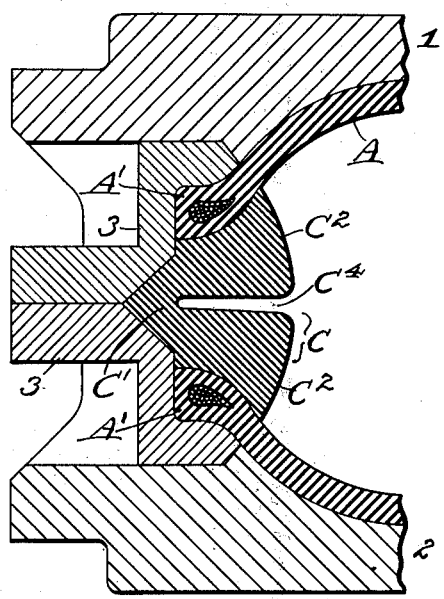

Reference will next be made to Figs. 4 and 5 which show a second embodiment of the invention. In these figures, the sealing ring C, made also of rubber, is of ordinary form, except that it is provided with a central circumferential slit $C^4$ which extends radially inward from the outer circumference of the ring to the toe line of the beads. Due to the presence of the slit $C^4$, the ring may be said to comprise a base member $C^1$ and two flexible side members $C^2$. In this instance, when the tire casing is mounted on the bead rings 3, the side members $C^2$ are pressed together as shown in Fig. 4, thus giving mutual support to each other in pressing the bead portions of the casing into the mold seats 4 and 5. When, however, the pressure fluid is admitted into the sealed casing, the fluid will enter the slit $C^4$ and force the side members $C^2$ apart as shown in Fig. 5, thus causing them to act in the manner of the side members $B^2$ of the first embodiment.

Figure 7:
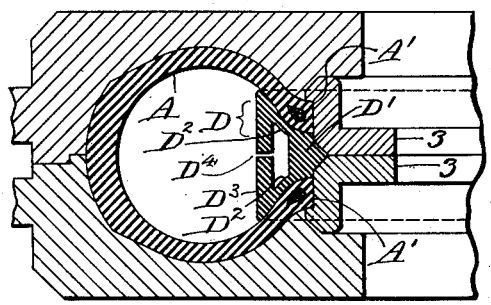
Figure 8:
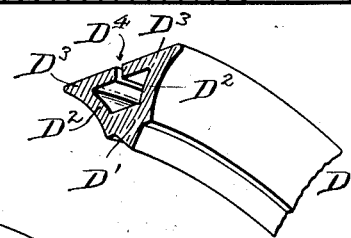
Fig. 8 is a perspective view of a section of the third form of sealing ring detached.

A third embodiment of the invention is illustrated in Figs. 7 and 8, where it will be seen that the sealing ring D, likewise made of rubber, is of ordinary contour, but is made hollow in carrying out the invention. In other words, the ring comprises a base member $D^1$, two side members or walls $D^2$, and an outer member or wall $D^3$, the latter being formed with a circumferential slit or opening $D^4$ (although holes or perforations would answer the same purpose) to establish communication between the interior of the hollow ring and the interior of the sealed casing. Here again, the side walls or members $D^2$, being flexible and elastic, will function in the same manner as the side members $B^2$ of the first embodiment. The outer wall $D^3$ is made thicker or heavier than the portions of the side walls which connect with the base member $D^1$, so that when the tire casing is mounted on the bead rings 3, the separated sections of the outer wall when brought together will, in conjunction with the base member $D^1$, afford sufficient rigidity to the ring as a whole to press the bead portions of the casing into the mold seats 4 and 5.

It will be understood, of course, that in both the second and third embodiments, the sealing ring will be provided with suitable valve stems for the admission of pressure fluid into the sealed casing, and moreover, that the sealing ring may be provided with lobes, like the lobes $B^7$ of the first embodiment, or some other suitable form of support for a tire casing made in pulley band form.

Figure 6:
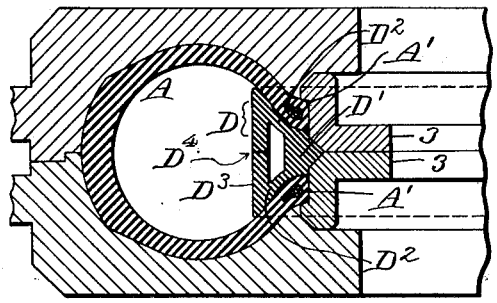
Figs. 6 and 7 are views similar to Figs. 1 and 2, showing a third form of sealing ring.

While in the several embodiments illustrated, the bead rings 3 are shown as separate from the mold sections 1 and 2, they could, if desired, be made integral to these sections, in which case the rimming up of the tire casing would take place during the act of closing the mold rather than as a separate preliminary operation. Again, while the improved form of sealing ring has been shown herein as composed wholly of rubber, it might be otherwise constituted so long as it is capable of performing its intended functions. Thus, referring to the first embodiment by way of illustration, the base member $B^1$, instead of being of rubber, could be made of metal so as to be completely rigid and the side members alone made of rubber, or in a broader sense, both the base member and side members could be made of metal provided the side members possessed the necessary degree of flexibility and the ring as a whole possessed the necessary degree of lateral expansibility. Moreover, while unnecessary, in both the first and second embodiments, the sealing ring could be formed with holes or perforations leading from the narrow channels or passages to the interior of the sealed casing to insure the entrance of the pressure fluid into said channels. The invention also comprehends a pressure sealing ring which derives its pressure independently of the pressure fluid admitted into the sealed casing. For example, a hollow pressure ring like that shown in Figs. 6 to 8 could be employed without the circumferential slit or opening $D^4$ and having its own inflating valve stem. These and other changes and modifications will readily suggest themselves to those skilled in the art without departing from the spirit of this invention.

Having thus described my invention what I claim is:

1. An annular ring for sealing a tire casing at the beads during vulcanization under direct internal fluid pressure, said ring being formed in zones including the beads of the tire casing sufficiently rigid to act as an abutment against which the tire casing throughout the radial extent of said bead zones may be locked preparatory to vulcanization and formed to permit of free lateral expansion from within in said bead zones by said fluid pressure, and said ring being closed at the base so as to act alone in sealing the casing.

2. A one piece rubber annular ring for sealing a tire casing at the beads during vulcanization under direct internal fluid pressure, said ring being formed in zones including the beads of the tire casing with flexible side walls adapted to be forced outwardly by the fluid pressure admitted into the sealed casing, and said ring also being formed intermediate said side walls so as to render them sufficiently rigid to act as an abutment against which the tire casing throughout the radial extent of said bead zones may be locked preparatory to vulcanization.

3. An annular ring for sealing a tire casing at the beads during vulcanization under direct internal fluid pressure, said ring being flexible and formed with a circumferential slit extending radially inward into zones including the beads of the tire casing and adapted to communicate with the interior of a sealed casing, said circumferential slit being narrow enough to permit the ring to act as an abutment against which the tire casing throughout the radial extent of said bead zones may be locked preparatory to vulcanization.

4. An annular ring for sealing a tire casing at the beads during vulcanization under direct internal fluid pressure, said ring comprising a relatively rigid base member, and two flexible side members separated from the base member in zones including the beads of the tire casing by narrow annular channels or passages adapted to communicate with the interior of a sealed casing, as and for the purpose described.

5. An annular ring for sealing a tire casing at the beads during vulcanization under direct internal fluid pressure, said ring comprising a relatively rigid base member and two flexible side members united thereto along lines located radially inward of the outer circumference of the base member so as to leave at opposite sides of the base member in zones including the beads of the tire casing narrow channels or passages adapted to communicate with the interior of a sealed casing, as and for the purpose described.

6. A sectional tire casing vulcanizing mold having bead seats, in combination with an annular ring constructed alone to seal a tire casing at the beads during vulcanization under internal fluid pressure in said mold, said ring being flexible enough at all points in its circumference in zones including the beads of the tire casing to conform itself to the contacting portions of the tire casing in locking the ring in place in the casing and yet sufficiently rigid for a radial distance to press the tire casing throughout the radial extent of said contacting portions into the mold seats in said locking operation, and said ring being formed to permit of free lateral expansion from within in said bead zones by the fluid pressure admitted into the casing, so that said pressure will be effective in sealing the tire cavity at the base and in shaping and molding the bead portions of the tire casing in the mold seats.

7. An annular ring for sealing a tire casing at the beads during vulcanization under direct internal fluid pressure, said ring being hollow with flexible side walls and formed with openings communicating with the interior of the sealed casing.

8. An annular ring for sealing a tire casing at the beads during vulcanization under direct internal fluid pressure, said ring being hollow with flexible side walls and having openings for the admission of fluid pressure into the same.

9. An annular ring for sealing a tire casing at the beads during vulcanization under direct internal fluid pressure, said ring being hollow with semi-rigid top and bottom walls and flexible side walls and having an opening in its top wall to establish communication with the interior of the sealed casing.

LAURITS A. LAURSEN.